United States Patent
Vassallo et al.

(10) Patent No.: US 6,445,793 B1
(45) Date of Patent: *Sep. 3, 2002

(54) ADJUSTABLE TELEPHONE SYSTEM AND METHOD

(75) Inventors: Steven P. Vassallo, Palo Alto; Steven R. Takayama, Atherton; Jonathan I. Kaplan, Palo Alto; Rudy L. Samuels, Bolinas; Heather Andrus; Jochen P. Backs, both of San Francisco, all of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/410,466

(22) Filed: Oct. 1, 1999

(51) Int. Cl.⁷ .................................................. H04M 1/00
(52) U.S. Cl. ............................ 379/428.01; 379/428.04; 379/436

(58) Field of Search ......................... 379/428.01, 428.04, 379/435, 436, 447, 446, 454, 455

(56) References Cited

U.S. PATENT DOCUMENTS

| | | | | |
|---|---|---|---|---|
| 5,862,214 A | * | 1/1999 | Aggus et al. | 379/435 |
| 6,104,807 A | * | 8/2000 | Johnson et al. | 379/428 |
| 6,351,535 B1 | * | 2/2002 | Nogas et al. | 379/436 |

* cited by examiner

Primary Examiner—Jack Chiang
(74) Attorney, Agent, or Firm—Baker Botts L.L.P.

(57) ABSTRACT

An adjustable telephone system includes a base and a support coupled to the base. The support is operable to dispose the base in a plurality of positions relative to a support surface. The telephone system also includes an actuator coupled to the support to effect movement of the support relative to the base. The telephone system may also include one or more add-on line modules. Each add-on line module may include a support operable to dispose each add-on line module in a plurality of positions relative to the support surface. Each add-on line module may also include an actuator to effect movement of each add-on line module support. The actuator disposed on each add-on line module may also effect movement of other supports.

9 Claims, 6 Drawing Sheets

ADJUSTABLE TELEPHONE SYSTEM AND METHOD

BACKGROUND OF THE INVENTION

Telephones generally include a base and a handset. The telephone base generally contains electrical circuitry for receiving and transmitting telephone communication signals. The telephone base may also contain various controls and features, such as a number keypad, a liquid crystal or other type of display, speed dial functions, call hold and transfer functions, and other features and controls associated with a telephone.

The telephone may also include an angled support for elevating the telephone relative to a support surface. The support may be configured integrally with the base or may be removable from the base. For example, a telephone with a removable support may require reversing the support and reattaching the support to the base to accommodate wall mounting of the telephone. Alternatively, wall mounting features of the telephone may be located beneath the support, thereby requiring removal of the support to access the wall mounting features.

The telephone may also be configured to receive an add-on line module. For example, the add-on line module may be connected to the telephone and used to monitor additional telephone circuits. The add-on line module may include a keypad and other controls and features associated with the telephone.

However, known telephone systems present certain drawbacks. For example, telephone bases and supports are generally configured with a fixed mounting angle, thereby limiting the position of the telephone relative to a support surface. Thus, the position of the telephone may not be easily adjusted to accommodate an increased view of telephone features or functions or to reduce glare associated with a telephone display. Additionally, removable supports may be misplaced or damaged.

Further, add-on line modules may cause instability of the telephone. For example, unsupported add-on line modules may cause an imbalance of the telephone, thereby causing movement of the telephone when utilizing features and controls of the add-on line module.

SUMMARY OF THE INVENTION

Accordingly, a need has arisen for an adjustable telephone system and method. The present invention provides an adjustable telephone system and method that addresses the shortcoming of prior systems and methods.

According to one embodiment of the present invention, an adjustable telephone system includes a base and a support coupled to the base. The support is operable to dispose the base in a plurality of positions relative to a support surface. The system also includes an actuator coupled to the support to effect movement of the support relative to the base.

According to another embodiment of the present invention, a method for adjusting a position of a telephone relative to a support surface includes providing a telephone having a base and a support. The method also includes releasing the support from a first secured location relative to the base and positioning the support in a second location relative to the base to dispose the base in one of a plurality of positions relative to the support surface. The method further includes securing the support in the second location.

Technical advantages of the present invention include providing an adjustable telephone system easily manipulated into a variety of positions relative to a support surface. For example, according to one aspect of the present invention, a support may be adjusted from a first location to a second location to reduce or substantially eliminate glare associated with a display of the telephone. Additionally, the angle of the telephone may be adjusted to increase the visibility of telephone features and controls.

Another technical advantage of the present invention includes providing a telephone system including add-on line modules with increased stability. For example, add-on line modules may also include an adjustable support, thereby providing stability to the telephone system. Additionally, a single actuator may be used to adjust the support associated with the add-on line module and the support associated with the telephone base.

BRIEF DESCRIPTION OF THE DRAWINGS

For a more complete understanding of the present invention and the advantages thereof, reference is now made to the following descriptions taken in connection with the accompanying drawings, in which.

DETAILED DESCRIPTION OF THE INVENTION

Embodiments of the present invention and its advantages are best understood by referring to the following description and drawings, wherein like numerals are used for like and corresponding parts of the various drawings.

Figure 1:
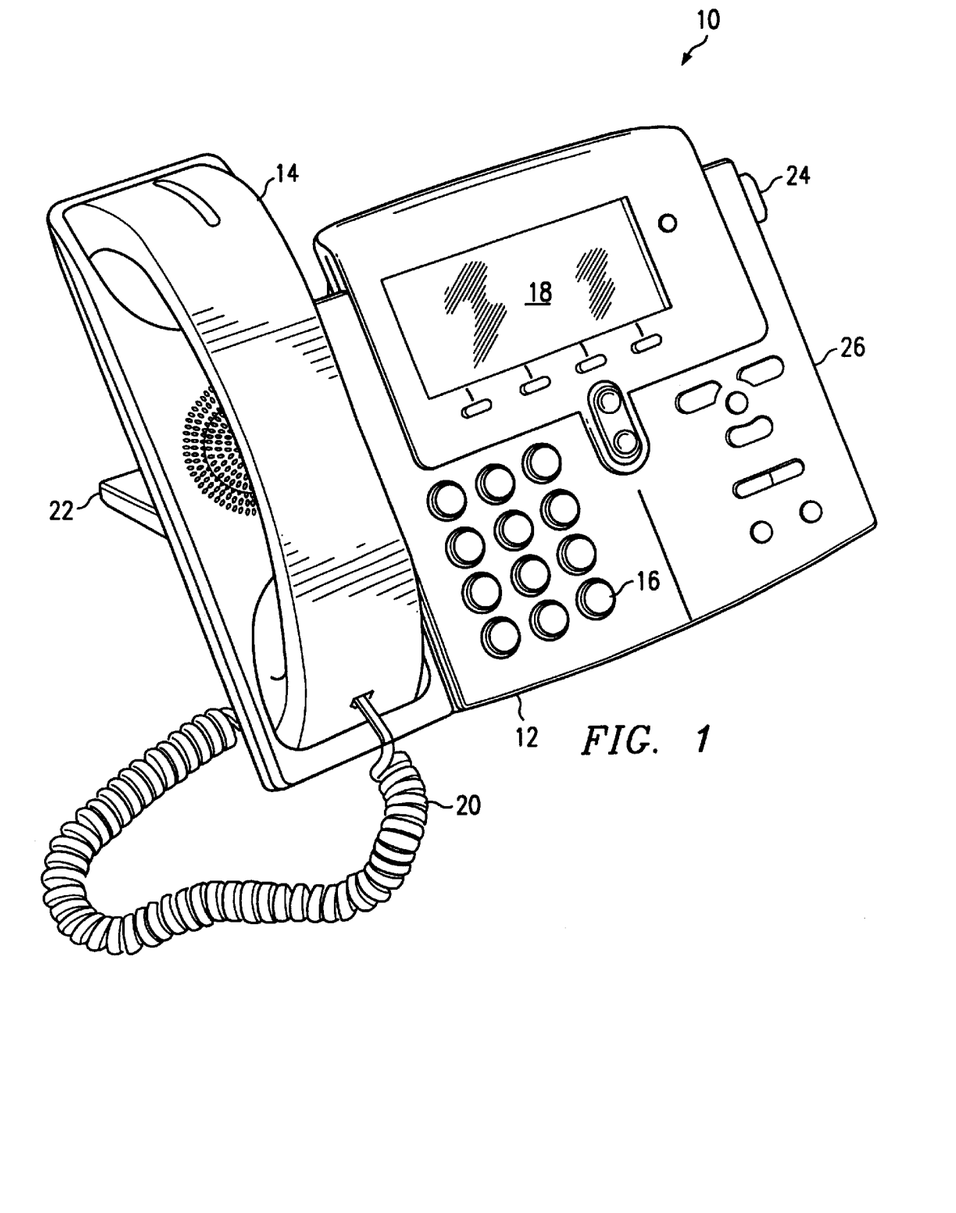
FIG. 1 is a schematic drawing of an adjustable telephone system in accordance with an embodiment of the present invention.

FIG. 1 illustrates an adjustable telephone system 10 in accordance with an embodiment of the present invention. Telephone system 10 includes a base 12 and a handset 14. Base 12 may include a keypad 16 and a display 18. Display 18 may include a liquid crystal or other suitable type of display. Telephone system 10 may also include other telephone function controls, such as a speaker control, a mute control, a forwarding control, a hold control, and the like. Telephone system 10 may also include a cord 20 to provide a communication medium between base 12 and handset 14 for transmitting audio communication signals between base 12 and handset 14. However, telephone system 10 may be configured without cord 20, such as in cordless telephone communication systems.

Telephone system 10 also includes a support 22 for disposing base 12 and handset 14 in a plurality of positions relative to a support surface. Telephone system 10 also includes an actuator 24 to effect movement of support 22 relative to base 12 and the support surface. Actuator 24 may be disposed on a side surface 26 of base 12. However, actuator 24 may also be located on other suitable surfaces or locations of telephone system 10.

Figure 2:
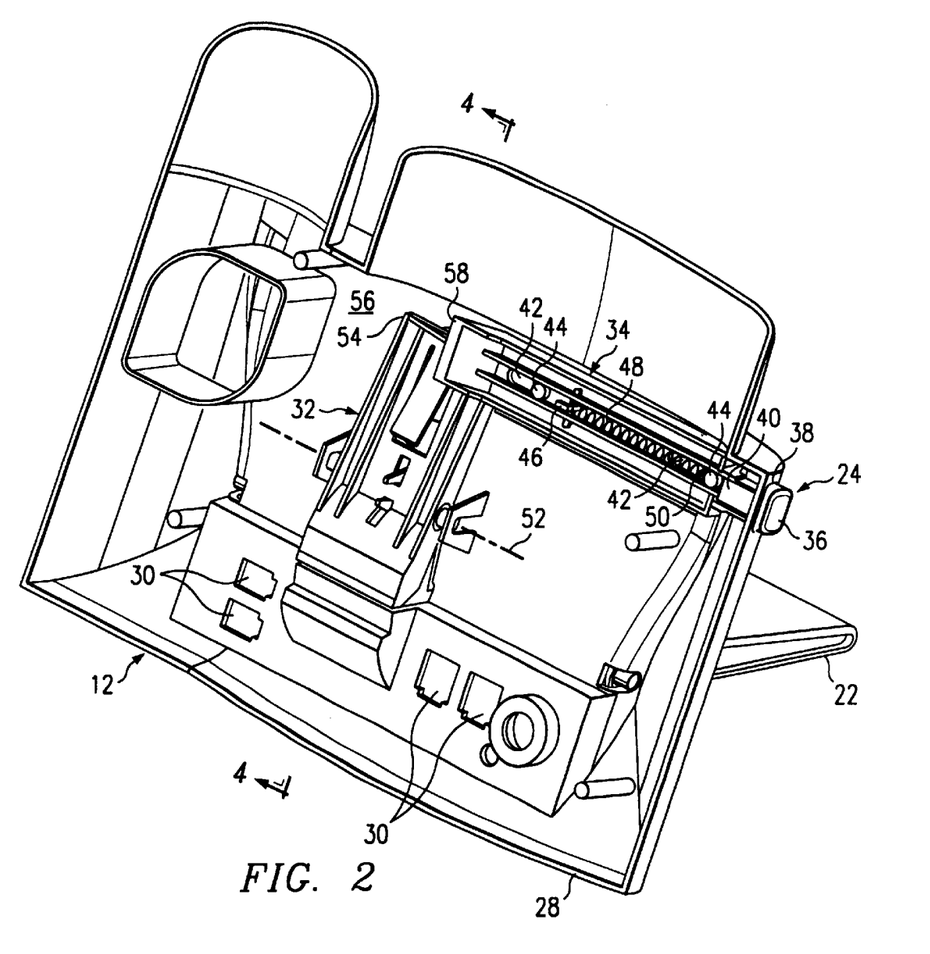
FIG. 2 is a schematic diagram illustrating an interior area of the adjustable telephone system illustrated in FIG. 1 in accordance with an embodiment of the present invention.

FIG. 2 is a schematic diagram illustrating an interior area of telephone system 10 in accordance with an embodiment of the present invention. Base 12 includes a housing 28 to contain electronic circuitry and other components of telephone system 10 within base 12. Housing 28 may include cable ports 30 for receiving external communication cables (not explicitly shown). In the embodiment illustrated in FIG. 2, cable ports 30 are disposed on a rearwardly facing surface of housing 28 below support 22 so that external communication cables avoid interfering with the movement of support 22. Support 22 may also include pads 31 to contact a support surface and provide clearance for the external communication cables. For example, pads 31 may be sized to provide a passage between support 22 and the support surface for routing the external communication cables to and from cable ports 30.

As described above in conjunction with FIG. 1, telephone system 10 includes actuator 24 to effect movement of support 22 relative to base 12. In the embodiment illustrated in FIG. 2, actuator 24 includes a latch 32, a slide 34, and a pushbutton 36. Pushbutton 36 extends through an opening 38 in housing 28 and attaches to an end 40 of slide 34. Thus, exerting a force on pushbutton 36 causes slide 34 to move in a direction away from surface 26.

Slide 34 includes openings 42 for receiving pins 44 of housing 28. Pins 44 may be used to secure slide 34 within housing 28. For example, pins 44 may be configured to provide a snap-lock assembly of slide 34 to housing 28. Pins 44 may also be used as a guide to control the direction of movement of slide 34. For example, openings 42 of slide 34 are illustrated having an oval or slot configuration to allow movement of slide 34 between pins 44. Pins 44 may also be used to limit the movement of slide 34. For example, openings 42 of slide 34 may be configured having a predetermined length as measured along slide 34, thereby limiting the amount of movement by slide 34.

Slide 34 includes a clip 46 for attaching one end of a spring 48. Housing 28 also includes a clip 50 for attaching the opposite end of spring 48. Spring 48 causes slide 34 to be biased toward opening 38. Thus, exerting a force on pushbutton 36 causes movement of slide 34 in a direction away from opening 38 and releasing pushbutton 36 causes slide 34 to be biased in a direction toward opening 38. However, other suitable methods or devices may be used to bias slide 34 in a direction toward pushbutton 36 so that releasing pushbutton 36 causes slide 34 to return to an initial position.

Latch 32 is secured to housing 28 so that latch 32 pivots about an axis 52. Additionally, as will be described in greater detail in conjunction with FIG. 3, an end 54 of latch 32 is biased away from a surface 56 of housing 28. In operation, exerting a force on pushbutton 36 causes movement of slide 34 in a direction toward latch 32. As slide 34 moves toward latch 32, an end 58 of slide 34 contacts end 54 of latch 32 and causes end 54 to move toward surface 56. Releasing pushbutton 36 causes slide 34 to move in a direction away from latch 32, thereby causing biased end 54 of latch 32 to move away from surface 56. Thus, depressing and releasing pushbutton 36 causes rotational movement of latch 32 about axis 52. The interaction of actuator 24 and support 22 will be described in greater detail in conjunction with FIG. 3.

Figure 3:
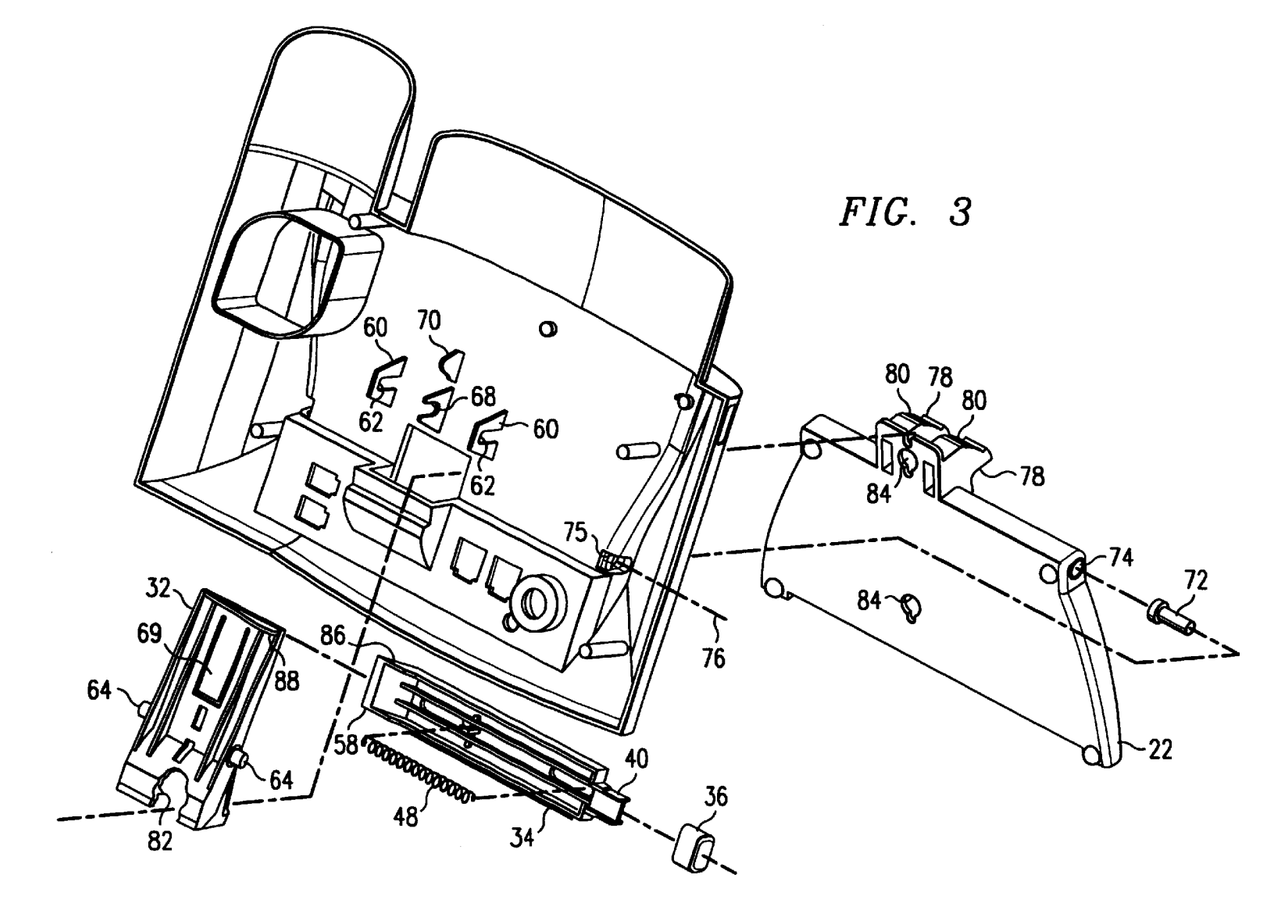
FIG. 3 is an exploded assembly diagram illustrating the adjustable telephone system of FIG. 1 in accordance with an embodiment of the present invention.

FIG. 3 is a schematic diagram illustrating an exploded view of telephone system 10 in accordance with an embodiment of the present invention. Housing 28 includes upstanding members 60 having openings 62 for receiving pivot pins 64 of latch 32. Housing 28 also includes upstanding members 66 having grooves 68 for receiving pivot pins 64 of latch 32. Pivot pins 64 may be configured integrally with latch 32 or may be configured separately. Thus, in operation, pivot pins 64 rest in groove 68 and extend through openings 62 of upstanding member 60.

Latch 32 is configured having a deflectable flap 69 disposed between end 54 of latch 32 and axis 52 and proximate to an upstanding member 70 disposed on housing 28 to bias end 54 of latch 32 away from surface 56 of housing 28. For example, upstanding member 70 extends upward away from surface 56 of housing 28 and contacts flap 69, thereby causing flap 69 to deflect upwardly away from surface 56 of housing 28. The deflection of flap 69 results in an opposing force directed downward from flap 69 toward upstanding member 70, thereby biasing end 54 of latch 32 away from surface 56 of housing 28. Thus, as will be described in greater detail below, latch 32 is rotationally biased about axis 52 such that latch 32 may releasably engage support 22. Other suitable methods or devices may also be used to provide biasing of latch 32 to releasably engage support 22.

Support 22 is rotationally coupled to housing 28 using pins 72. For example, a pin 72 may be inserted through an opening 74 in support 22 and into an opening 75 in housing 28. Thus, support 22 may be rotated about an axis 76 relative to housing 28. However, other suitable methods or devices may be used to couple support 22 to housing 28.

Support 22 includes arcuately formed legs 78, each leg 78 having a plurality of teeth 80. Teeth 80 are used to secure support 22 in a plurality of positions relative to housing 28. In operation, an end 82 of latch 32 releasably engages teeth 80 of support 22 to secure support 22 in a desired position. For example, latch 32 may be rotated about pivot pin 64 to engage teeth 80 and secure support 22 in a desired position. End 82 may be disengaged from teeth 80 by rotating latch 32 about pivot pin 64, thereby releasing support 22 for movement of support 22 to another desired position.

Support 22 also includes keyholes 84 to accommodate wall mounting of telephone system 10. For example, support 22 may be rotated upwardly about axis 76 toward housing 28, thereby allowing access to keyholes 84 to accommodate wall mounting of telephone system 10. Therefore, the present invention provides greater flexibility than prior telephone systems by accommodating a variety of mounting positions.

In operation, a force exerted on pushbutton 36 causes slide 34 to move in a direction toward latch 32. As slide 34 moves toward latch 32, an angled surface 86 at end 58 of slide 34 contacts a rail 88 at end 54 of latch 32 causing end 54 of latch 32 to deflect downwardly toward surface 56. As end 54 deflects downwardly toward surface 56, end 82 is deflected away from teeth 80, thereby allowing movement of support 22 into a desired position. After support 22 is moved to a desired position, pushbutton 36 may be released, thereby causing slide 34 to move in a direction away from latch 32. As slide 34 moves away from latch 32, upstanding member 70 biases end 54 away from surface 56, thereby causing end 82 to engage teeth 80 of support 22 and secure support 22 in the desired position.

Figure 4A:
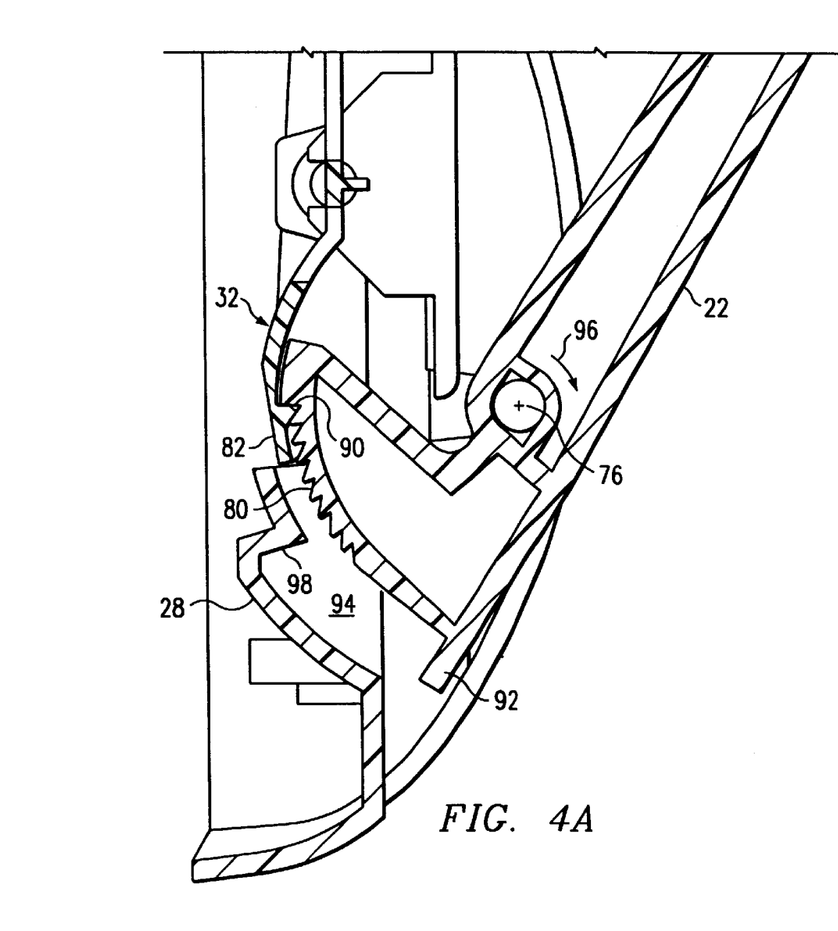
FIGS. 4A and 4B are section diagrams of various positions of the adjustable telephone system illustrated in FIG. 2 taken along the line 4—4 of FIG. 2.

FIG. 4A is a cross-section view of telephone system 10 illustrated in FIG. 2 taken along the line 4—4 of FIG. 2. In FIG. 4A, support 22 is secured in one of a plurality of positions relative to housing 28. For example, end 82 of latch 32 may include a protrusion 90 to releasably engage teeth 80 of support 22. In operation, exerting a force on pushbutton 36 causes end 82 of latch 32 to deflect away from teeth 80, thereby disengaging protrusion 90 from teeth 80 and allowing movement of support 22 about axis 76. After a desired position for support 22 is located, pushbutton 36 may be released, thereby causing protrusion 90 to engage teeth 80 and secure support 22 in the desired position.

Support 22 may also include a stop 92 to prevent over-rotation or over-extension of support 22. For example, housing 28 may be configured with a recessed area 94 for receiving stop 92. As support 22 is rotated about axis 76 in a direction 96, recessed area 94 receives stop 92 until stop 92 contacts surface 98 of housing 28. Thus, the stop 92 contacts surface 98 and prevents additional rotation of support 22 in direction 96.

Figure 4B:
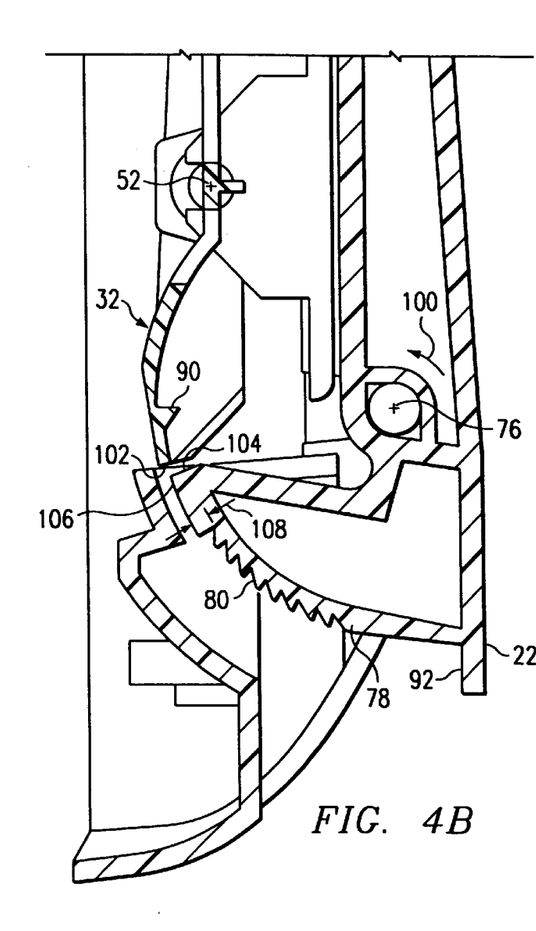

FIG. 4B is a section view of telephone system 10 illustrated in FIG. 2 taken along the line 4—4 of FIG. 2 illustrating another position of support 22. In FIG. 4B, support 22 is positioned to accommodate wall mounting of telephone system 10. For example, support 22 may be rotated about axis 76 in a direction 100 so that an edge 102 of latch 32 engages a surface 104 of legs 78. Thus, latch 32 secures support 22 in a wall mount position, thereby providing access to keyholes 84.

Telephone system 10 may also be configured to require an additional actuation force to position support 22 for wall mounting of telephone system 10. For example, support 22 may be configured so that a surface 106 of legs 78 adjacent teeth 80 includes a height 108 greater than a height of teeth 80. Configuring surface 106 having height 108 greater than the height of teeth 80 requires latch 32 to deflect away from legs 78 an additional amount to allow protrusion 90 to deflect above surface 106 so that support 22 may be rotated in direction 100. Thus, in operation, pushbutton 36 may be depressed to a first level allowing support 22 to be rotated adjacent protrusion 90 for releasably engaging teeth 80. Additionally, pushbutton 36 may be depressed to a second level allowing protrusion 90 to deflect above surface 106, thereby allowing support 22 to rotate in direction 100 an additional amount to accommodate wall mounting.

Thus, telephone system 10 provides greater flexibility than prior telephone systems by providing a user with a variety of positioning options for telephone system 10 to accommodate a variety of viewing and operating conditions. For example, lighting conditions, such as fluorescent office lighting, may inhibit viewing of a liquid crystal display, keypad, or other telephone feature. Additionally, telephone features may be difficult to view or operate due to the position of the user relative to the telephone system. In accordance with the teachings of the present invention, telephone system 10 may be easily manipulated into a position to increase the visibility and accessability of such telephone features. For example, a user of telephone system 10 may depress pushbutton 36, position support 22 in a desired location to increase visibility or accessability of the telephone feature, and release pushbutton 36 to secure support 22 in the desired position.

Figure 5:
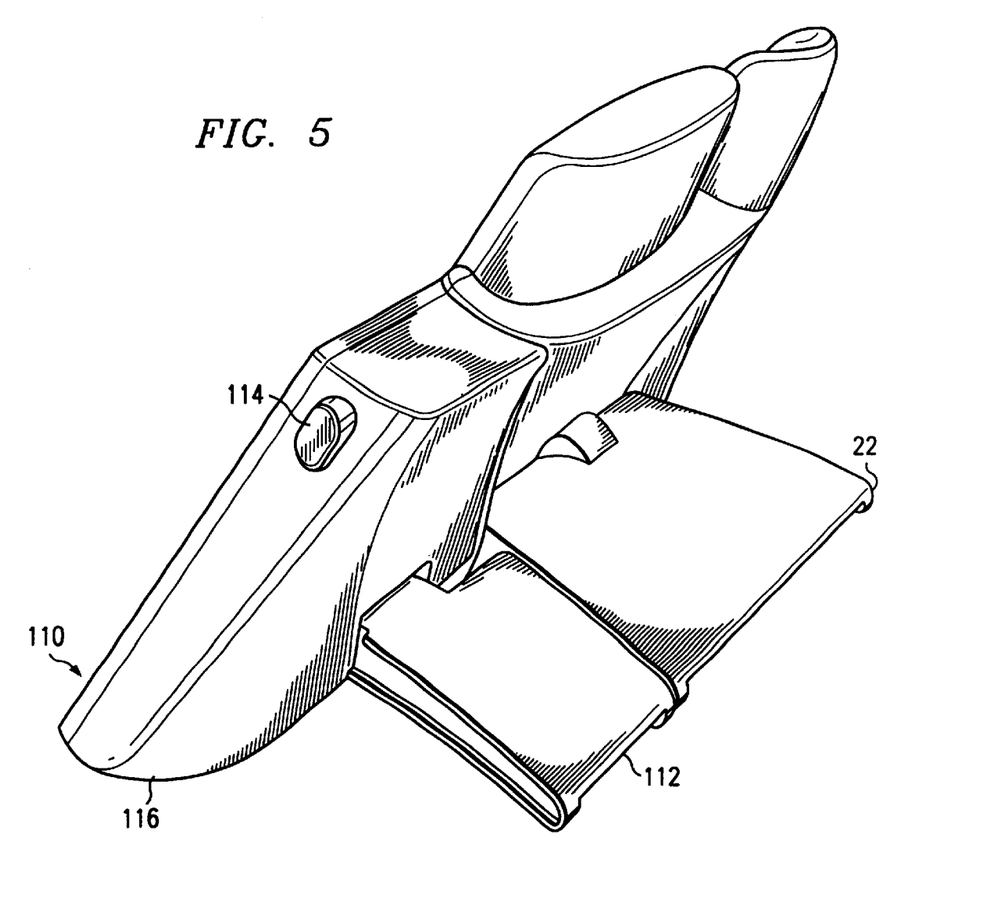
FIG. 5 is a schematic diagram illustrating an adjustable telephone system including an add-on line module in accordance with an embodiment of the present invention.

FIG. 5 is a schematic diagram illustrating telephone system 10 with an add-on module 110. Add-on module 110 may be connected to telephone system 10 and used to monitor additional telephone circuits. Add-on module 110 may include a display and various keypad functions and controls (not explicitly shown). Add-on module 110 also includes a support 112 and an actuator 114. Support 112 may be used to dispose add-on module 110 in a plurality of positions relative to a support surface. Actuator 114 may be used to effect movement of support 112 relative to a base 116 of add-on module 110 and the support surface. Telephone system 10 and add-on module 110 may be configured to provide independent rotation or movement of supports 22 and 112. Additionally, support 22 and support 112 may be mechanically coupled to provide tandem movement or rotation of supports 22 and 112.

Figure 6:
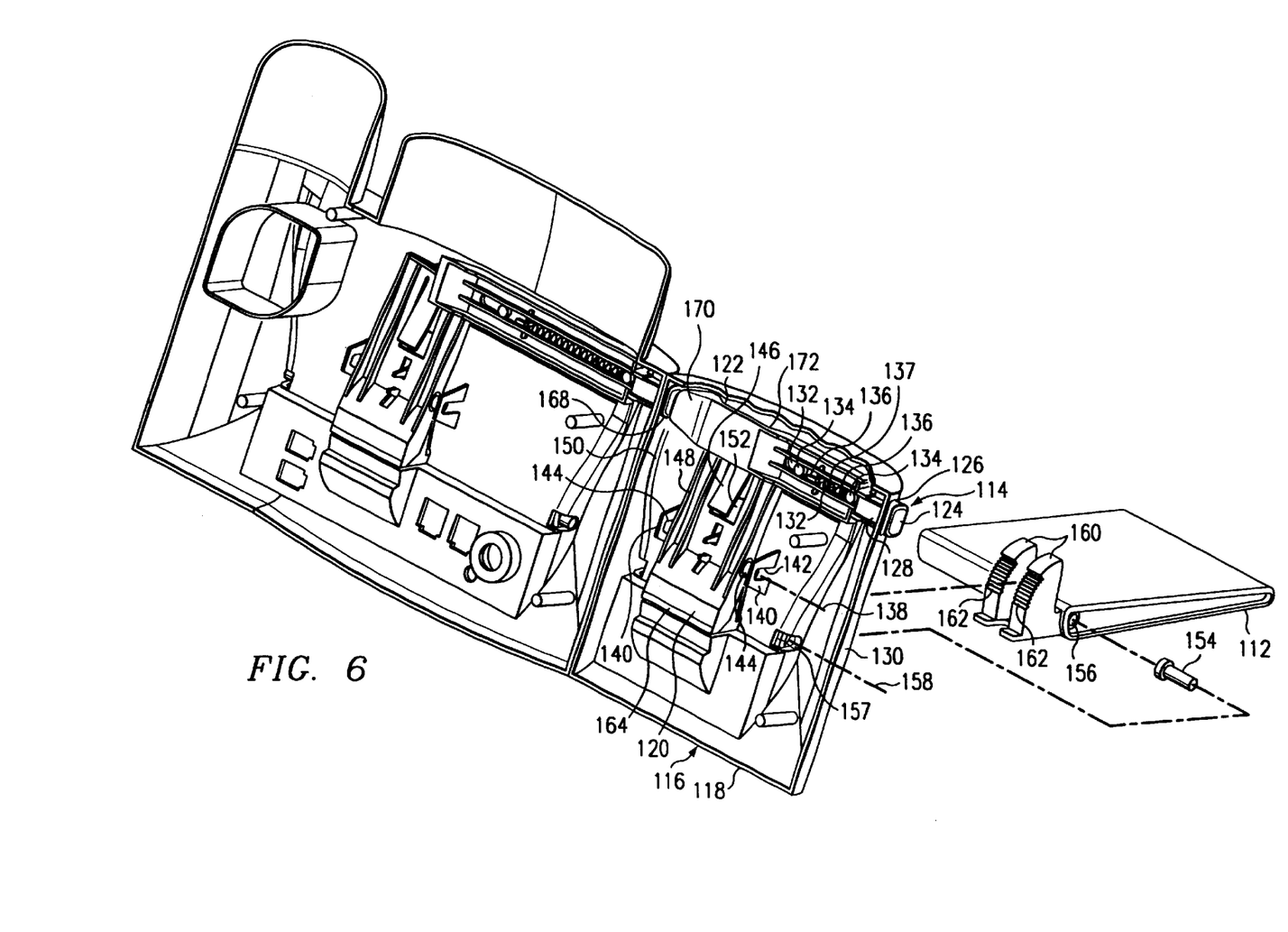
FIG. 6 is a partially exploded assembly diagram illustrating the adjustable telephone system and add-on line module illustrated in FIG. 5 in accordance with an embodiment of the present invention.

FIG. 6 is a schematic diagram illustrating an interior area of telephone system 10 and add-on module 110 in accordance with an embodiment of the present invention. Base 116 of add-on module 110 includes a housing 118 to contain electronic circuitry and other components of add-on module 110. As described above in connection with FIG. 5, add-on module 110 includes actuator 114 to effect movement of support 112 relative to base 116. In the embodiment illustrated in FIG. 6, actuator 114 includes a latch 120, a slide 122, and a pushbutton 124. Pushbutton 124 extends through an opening 126 in housing 118 and attaches to an end 128 of slide 122. Thus, exerting a force on pushbutton 124 causes slide 122 to move in a direction away from a surface 130 of housing 118.

Slide 122 includes openings 132 for receiving pins 134 of housing 118. Pins 134 may be used to secure slide 122 within housing 118. For example, pins 134 may be configured to provide a snap-lock assembly of slide 122 to housing 118. However, other suitable methods or devices may be used to secure slide 122. Pins 134 may also be used as a guide to control the direction of movement of slide 122. For example, openings 132 of slide 122 are illustrated having an oval or slot configuration to allow movement of slide 122 in a direction between pins 134. Pins 134 may also be used to limit the movement of slide 122. For example, openings 132 of slide 122 may be configured having a predetermined length as measured along slide 122, thereby limiting the amount of movement by slide 122.

Slide 122 and housing 118 include clips 136 for attaching each end of a spring 137 to cause slide 122 to be biased toward opening 126. Thus, exerting a force of pushbutton 124 causes movement of slide 122 in a direction away from opening 126 and releasing pushbutton 124 causes movement of slide 122 in a direction toward opening 126. However, other suitable methods or devices may be used to bias slide 122 in a direction toward pushbutton 124 so that releasing pushbutton 124 causes slide 122 to return to an initial position.

Latch 120 is secured to housing 118 so that latch 120 pivots about an axis 138. For example, housing 118 may include upstanding members 140 having openings 142 to receive pivot pins 144 of latch 120. Pivot pins 144 may be configured integrally with latch 120 or may be configured separately.

Latch 120 may also be configured having a deflectable flap 146 to bias end 148 of latch 120 away from a surface 150 of housing 118. For example, housing 118 may include an upstanding member 152 disposed beneath flap 146 of latch 120 to provide deflection of flap 146 away from surface 150 of housing 118. The deflection of flap 146 away from surface 150 causes an opposing downwardly directed force from flap 146 toward upstanding member 152, thereby causing end 148 of latch 120 to be biased away from surface 150. Thus, latch 120 is rotationally biased about axis 138 to releasably engage support 112. However, other suitable biasing methods or devices may be used to provide releasable engagement of latch 120 with support 112.

Support 112 is rotationally coupled to housing 118 using pins 154. For example, pins 154 may be inserted through an opening 156 in support 112 and into an opening 157 in housing. Thus, support 112 may be rotated about an axis 158 relative to housing 118. However, other suitable methods and devices may be used to couple support 112 to housing 118.

Support 112 includes arcuately formed legs 160, each leg 160 having a plurality of teeth 162. Teeth 162 are used to secure support 112 in a plurality of positions relative to housing 118. In operation, an end 164 of latch 120 releasably engages teeth 162 of support 112 to secure support 112 in a desired position. For example, latch 120 may be rotated about axis 138 to engage teeth 162 and secure support 112 in a desired position. End 164 of latch 120 may be disengaged from teeth 162 by rotating latch 120 about axis 138, thereby releasing support 112 for movement of support 112 to another desired position. For example, end 164 of latch 120 may include a protrusion 166 to releasably engage teeth 162 of support 112.

Housing 118 also includes an opening 168 to receive pushbutton 36 of actuator 24. For example, add-on module 110 may be positioned adjacent base 12 such that pushbutton 36 extends through opening 168 to an interior area of add-on module 110. Slide 122 may be configured having a length such that an end 170 of slide 122 is positioned adjacent pushbutton 36. Thus, in operation, exerting a force on pushbutton 124 causes movement of slide 122 in a direction toward slide 34. As slide 122 moves toward slide 34, end 170 of slide 122 contacts pushbutton 36 and causes concurrent movement of slide 34 in the same direction. Therefore, applying a force to pushbutton 124 causes movement of both slides 122 and 34 to effect movement of supports 112 and 22.

In operation, a force exerted on pushbutton 124 causes slide 122 to move in a direction toward latch 120. As slide 122 moves toward latch 120, an angled surface 172 of slide 122 contacts end 148 of latch 120 causing end 148 of latch 120 to deflect downwardly toward surface 150. As end 148 deflects downwardly toward surface 150, end 164 of latch 120 is deflected away from teeth 162, thereby allowing movement of support 112 into a desired position. After support 112 is moved to a desired position, pushbutton 124 may be released, thereby causing slide 122 to move in a direction away from latch 120. As slide 122 moves away from latch 120, upstanding member 152 biases end 148 of latch 120 away from surface 150, thereby causing end 164 of latch 120 to engage teeth 162 of support 112 and secure support 112 in the desired position.

Thus, telephone system 10 provides greater stability than prior telephone systems by providing flexible support for add-on module 110. For example, forces applied to function keys or other features of an unsupported add-on module may result in an imbalance of the telephone system caused by the distance between the add-on module and the support of the base telephone. In accordance with the teachings of the present invention, support 112 provides support for add-on module 110, thereby substantially eliminating any imbalance resulting from the addition of add-on line modules.

Additionally, telephone system 10 provides greater flexibility than prior telephone systems. For example, base 12 and add-on module 110 may be easily manipulated into a variety of positions relative to a support surface by depressing pushbutton 124, locating supports 22 and 112 in a desired position, and releasing pushbutton 124 to secure supports 22 and 112 in the desired position.

Further, additional add-on modules 110 may be coupled to telephone system 10 while maintaining the same ease of operation. For example, additional add-on modules 110 may be coupled to add-on module 110 illustrated in FIG. 6, thereby resulting in a continuous linking of actuators 114 of the add-on modules 110 and actuator 24 of base 12. Thus, telephone system 10 provides greater flexibility than prior telephone systems by allowing numerous add-on modules 110 to be added while maintaining ease of operation and stability.

Although the present invention and its advantages have been described in detail, it should be understood that various changes, substitutions, and alterations can be made therein without departing from the spirit and scope of the present invention as defined by the appended claims.

What is claimed is:

1. An adjustable telephone system comprising:

a base;

an add-on module coupled to the base;

a first support rotatably coupled to the base and operable to dispose the base in a selected one of a plurality of positions relative to a support surface, wherein the first support comprises a first plurality of teeth operable to secure the first support in each of the plurality of positions, the first teeth disposed arcuately around an axis of rotation of the rotatable coupling;

a second support rotatably coupled to the add-on module and operable to dispose the add-on module in the selected one of the plurality of positions, wherein the second support comprises a second plurality of teeth operable to secure the second support in each of the plurality of positions, the second teeth disposed arcuately around the axis of rotation;

a first actuator disposed on the base to effect movement of the first support relative to the base, wherein the actuator comprises a first latch operable to releasably engage the first teeth; and a second actuator disposed on the add-on module to effect movement of the first support and the second support relative to the base, wherein the second actuator comprises a second latch operable to releasably engage the second teeth, wherein the second actuator is further operable to effect disengagement of the first latch from the first teeth and the second latch from the second teeth.

2. The telephone system of claim 1, wherein the first actuator further comprises a first slide to effect movement of the first latch relative to the first teeth.

3. The telephone system of claim 2, wherein the first slide is operable to exert a force on the first latch, the force effecting disengagement of the first latch from the first teeth.

4. The telephone system of claim 2, wherein the first actuator further comprises a pushbutton coupled to the first slide such that the application of a force on the pushbutton disengages the first latch from at least one of the first teeth.

5. The telephone system of claim 4, wherein releasing the force on the pushbutton releasably engages the first latch to at least one of the first teeth.

6. The telephone system of claim 1, wherein the second actuator further comprises a second slide to effect movement of the second latch relative to the second teeth responsive to a force on the second slide.

7. The telephone system of claim 6, wherein the second slide is positioned to apply the force to the first slide.

8. The telephone system of claim 7, wherein the first slide is operable to transfer the force from the second slide to the first latch.

9. The telephone system of claim 1, wherein the first support comprises a plurality of pads operable to contact the support surface, the pads further operable to provide a passage for a cable coupled to the base.

\* \* \* \* \*